July 18, 1961 H. M. AUGSBURGER 2,993,079
ELECTRIC HEATING METHOD AND APPARATUS FOR UNIFORMLY HEATING GLASS
Filed April 15, 1957 7 Sheets-Sheet 1

INVENTOR.
HERBERT M. AUGSBURGER
BY J. R. NELSON
LEONARD D. SOUBIER

July 18, 1961   H. M. AUGSBURGER   2,993,079
ELECTRIC HEATING METHOD AND APPARATUS FOR UNIFORMLY HEATING GLASS
Filed April 15, 1957   7 Sheets-Sheet 3

INVENTOR.
HERBERT M. AUGSBURGER
BY
J. R. NELSON
LEONARD D. SOUBIER

July 18, 1961     H. M. AUGSBURGER     2,993,079
ELECTRIC HEATING METHOD AND APPARATUS FOR UNIFORMLY HEATING GLASS
Filed April 15, 1957     7 Sheets-Sheet 4

INVENTOR.
HERBERT M. AUGSBURGER
BY
J. R. NELSON
LEONARD D. SOUBIER

July 18, 1961 H. M. AUGSBURGER 2,993,079
ELECTRIC HEATING METHOD AND APPARATUS FOR UNIFORMLY HEATING GLASS
Filed April 15, 1957 7 Sheets-Sheet 5

INVENTOR.
HERBERT M. AUGSBURGER
BY
J. R. NELSON
LEONARD D. SOUBIER

July 18, 1961    H. M. AUGSBURGER    2,993,079
ELECTRIC HEATING METHOD AND APPARATUS FOR UNIFORMLY HEATING GLASS
Filed April 15, 1957    7 Sheets-Sheet 6

INVENTOR.
HERBERT M. AUGSBURGER
BY J. R. NELSON
LEONARD D. SOUBIER

United States Patent Office 2,993,079
Patented July 18, 1961

2,993,079
ELECTRIC HEATING METHOD AND APPARATUS FOR UNIFORMLY HEATING GLASS
Herbert M. Augsburger, Toledo, Ohio, assignor to Owens-Illinois Glass Company, a corporation of Ohio
Filed Apr. 15, 1957, Ser. No. 652,777
6 Claims. (Cl. 13—6)

This invention relates to glass furnaces and more particularly to a means and method for uniformly applying heat to glass in selected areas of the furnace. The invention is adaptable to the production of glass in a continuous or batch process wherein the melting and refining of the glass are accomplished either entirely by means of heat developed by passage of electric current through the glass (all-electric heating) or by the combination of radiant heating from combustion of consumable fuels and booster heating from electric current passed through the glass.

The invention is adaptable to a continuous flow type glass furnace in which the batch is delivered to the melting area through the open top of the furnace and laid in an even blanket over the top of the molten mass of glass therein. Batch may be alternatively delivered from one end of the furnace and the refined glass removed at the other end.

By utilizing the present invention, the "pull" or rate of production of the furnace may be increased and the quality of the glass delivered to the forming machinery by the furnace is substantially increased. This is believed to be due to the following advantages obtainable by the uniform heating attainable by this invention.

It has been well known in the glass art for some time that the melting of glass creates and sustains convection currents within the molten mass of glass. These convection currents were considered, until recently, to be beneficial and have been promoted. It is now considered, especially in the installations where batch is laid in a blanket, that these currents in the glass are undesirable and unnecessary. Turbulence created by these convection currents in the glass mass in the melting zone causes unmelted batch and other impurities to be carried from the melting zone into the refining zone. Likewise, in the refining zone of the furnace, turbulence in the glass mass stirs up eroded refractories, unmelted batch and other impurities and carries them into the working area of the furnace where glass is being delivered to machines for forming the finished article.

Also, lessening the amount of movement of the glass in the furnace caused by convection currents decreases furnace wear and erosion. These currents are minimized by applying the heat to the glass uniformly.

It is, therefore, the object of the present invention to provide a method and apparatus for uniformly heating glass in any selected zone of the furnace and thereby reduce convection currents in the glass in that zone.

A further object of the invention is to provide a novel placement of electrodes so that their inner tips lie in a geometric pattern in a plane of the furnace and are connected into a circuit for energizing such electrodes so that the proportion of voltage to distance between different pairs of the electrodes will be equal.

Another object of the invention is to provide uniform heating in any selected plane of the furnace.

Another object of the invention is to provide uniform electric heating in a glass furnace for producing glass therein that is more uniform and homogeneous.

Another object of the invention is to apply polyphase power to electrodes arranged in a plane of a glass furnace to transcribe a regular geometric figure between adjacent electrodes, and the number of electrodes are equal to or a multiple of the number of the electric power phases applied thereto.

Still another object of the invention is to provide uniform electrical heating through arrangement of electrodes in a glass furnace, whereby the electrodes will each wear uniformly.

The specific nature of this invention, as well as other objects and advantages thereof, will become apparent to those skilled in the art from the following detailed description, taken in conjunction with the annexed sheets of drawings on which, by way of preferred example only, are illustrated several embodiments of this invention.

Generally, the invention resides in providing electric heating in a given zone of the glass furnace, which heating is uniformly applied between spaced electrodes. As a further part of this invention, the electrodes are spaced in a common plane of the furnace and their inner projecting ends are spaced equally one from the other so that the inner tips of the electrodes define a geometric figure in a selected plane of the furnace. When applying a polyphase power source to the electrodes so arranged in the furnace, the number of power phases of the polyphase system is equal to the number of equal spacings on the perimeter of the defined geometric figure, and the power will thus be applied throughout this plane of the furnace at a uniform voltage per unit length of path through the glass. In other words, any two points in the furnace which are one inch apart in that plane would have the same voltage between them as any other two points in that plane which are one inch apart. On the basis of the foregoing, the power applied in that plane of the furnace will be uniform and the resultant temperature of the glass in that plane will also be uniformly maintained. By applying the heat to the glass uniformly, convection currents in the glass body will be minimized. In heating by the well-known electrical principle of Joule effect, the heat supplied is directly proportional to electrical power consumption, and if, in a selected plane of the furnace, the glass is heated uniformly so that its resistance remains substantially constant, the power will vary directly as the square of the voltage. Hence, as is the case in this invention, if the voltage drop per unit of length between any selected pair of electrodes connected to the power source is the same, the power consumed will likewise be the same, and since power is measured as a function of the voltage and resistance to which current is applied, Joule effect heating for that length will be the same. Uniform heating in this plane of the furnace area will therefore be the result.

Referring more particularly to the drawings, the structure of the invention and the power circuits utilized will now be described.

Figure 1:
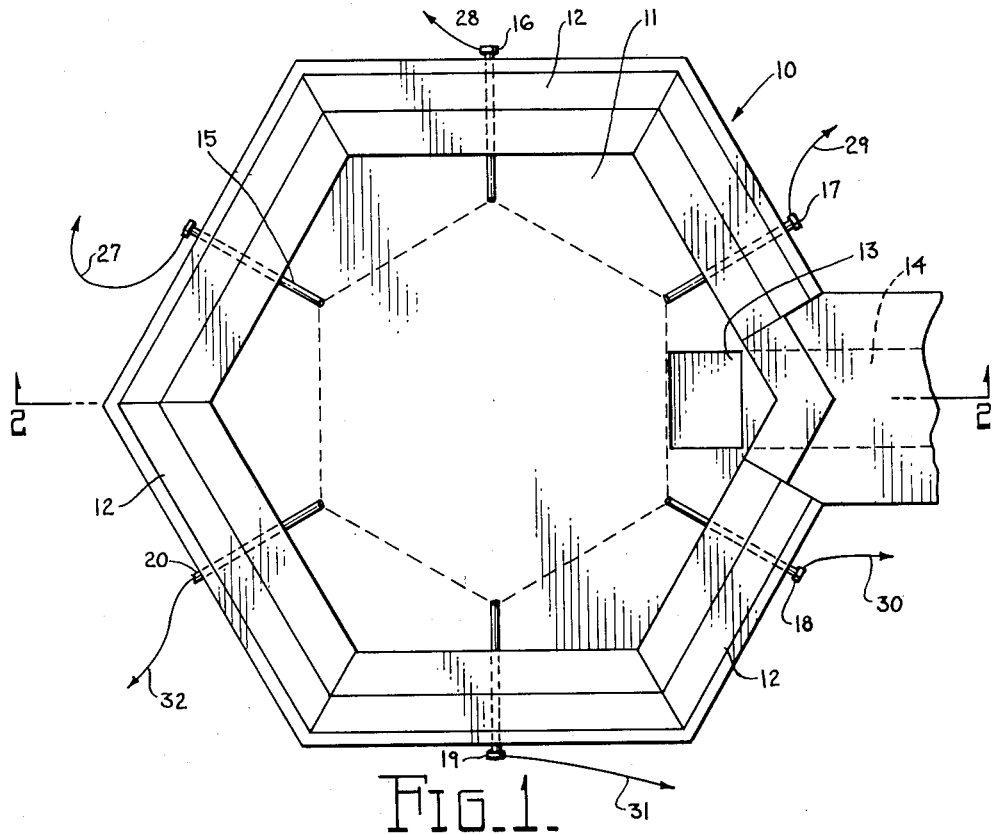
FIG. 1 is a plan view of a hexagonally-shaped glass melter provided with a set of electrodes arranged at equally-spaced distances apart about regular hexagons, and illustrates one form of the invention.
Figure 2:
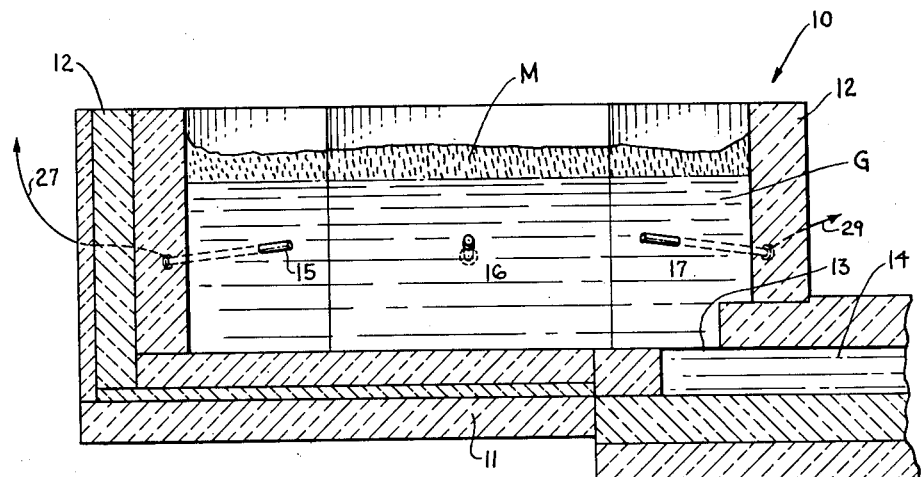
FIG. 2 is a sectional elevational view, taken along line 2—2 in FIG. 1.

In FIGS. 1 and 2, a hexagonally-shaped melting chamber of a furnace, referred to generally at reference numeral 10, is defined by a bottom wall 11 and six-side walls 12. Raw batch materials are added through the open top of the melting chamber 10 to form a blanket of batch M (FIG. 2) over the molten body of molten glass G contained in melter 10. Batch blanket M is relatively thin in relation to the depth of the underlying body of molten glass G. A throat outlet 13 in side wall 12 near one end of bottom wall 11 communicates with throat passage 14 leading to a refining chamber (not shown). Six electrodes, numbered 15 through 20, are arranged as a set to project through apertures in side walls 12, and are retained thereat so that their inner ends lie at the corners of a regular hexagon in a selected horizontal plane of melter 10, indicated by the connecting dotted line drawn between electrode tips in FIGS. 1 and 2. The electrodes, 15 through 20, arranged in a set as above described, lie in a horizontal plane near the central portion of melter 10. Each electrode is electrically connected to a different power phase of a six-phase power source, as will be hereinafter more particularly described. These electric connections are indicated by wires 27—32 which connect electrodes 15, 16, 17, 18, 19, and 20, respectively, to the corresponding six-power phases on the secondary side of the transformer, shown in the wiring diagram on FIG. 10.

Figure 10:
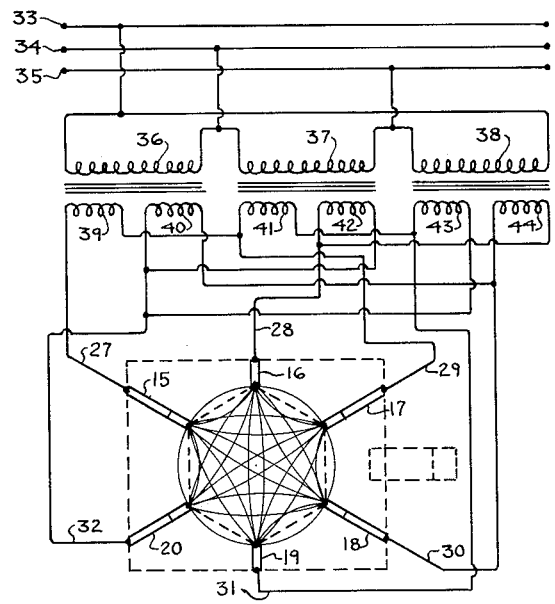
FIG. 10 is a schematic wiring diagram for the regular hexagonal arrangement of electrodes shown on FIGS. 1–7.

In FIG. 10, the three-power phases of a standard main line supply are indicated by reference numerals 33, 34, and 35. The primary windings of the transformer, indicated respectively at reference numerals 36, 37, and 38 are delta connected across main lines 33, 34, and 35. The secondary windings of the transformer, indicated at reference numerals 39 through 44, are double delta connected with reversed phase rotation between each of the two deltas so that secondary windings 39, 41, and 43 comprise one delta connection and secondary windings 40, 42, and 44 comprise the other delta connection, its phase rotation being reversed from said first-mentioned delta connection. More specifically stated, lead wire 27 on electrode 15 forms a connection with secondary winding 39, lead wire 29 on electrode 17 is connected to secondary winding 41 and lead wire 31 on electrode 19 is connected into secondary winding 43. Similarly, but with reverse phase rotation, lead wire 28 on electrode 16 is connected to secondary winding 42, lead wire 30 on electrode 18 connected to secondary winding 44 and lead wire 32 on electrode 20 is connected to secondary winding 40. With the electrodes 15 through 20 thus connected to the six-phase power source, current will flow through the glass between these electrodes in a pattern designated by looped lines indicating current flow (FIG. 10).

The above described connections merely illustrate one connection for the hexagonal electrode arrangement of the invention. Other operable connections which could be made for the transformation of three-phase line power to six-phase power (at the secondary winding of the transformer) would be the primary windings connected in delta, as shown on FIG. 10, but the secondary windings 39 through 44 of the transformer connected in either double Y, diametrical, chord or ring connection. The primary windings 36, 37, and 38 may also be connected in a Y connection for each of the said secondary connections mentioned. These and other operative combinations of parallel transformer connections are set forth in Kent's Mechanical Engineer's Handbook, vol. 11th ed., published by John Wiley and Sons, at sections 15—18 and 15—19, and are more particularly referred to in table 13 at section 15—19.

Figure 3:
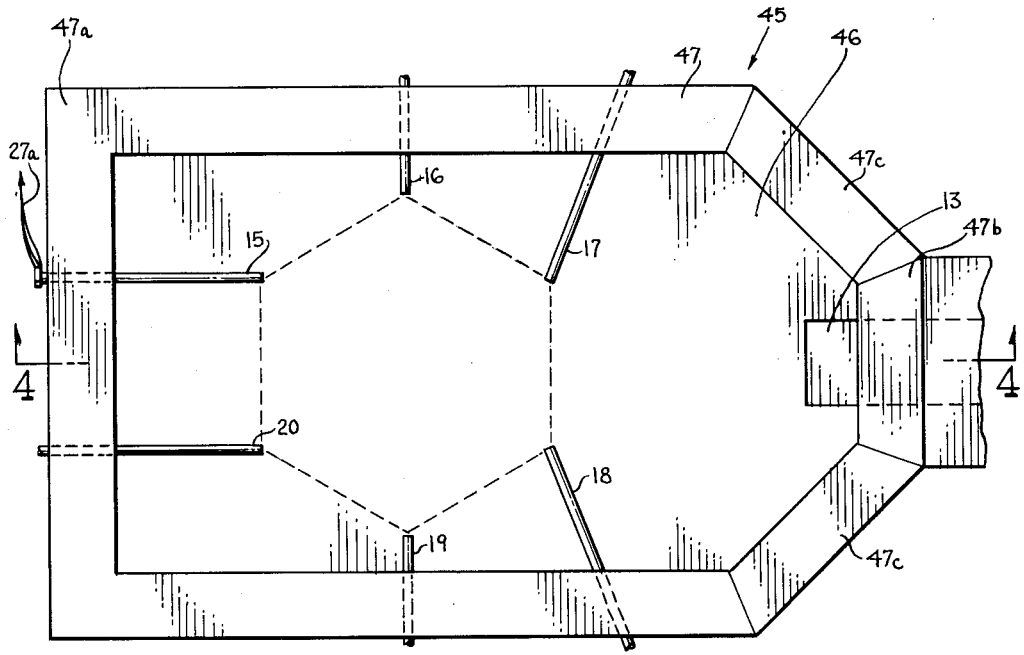
FIG. 3 is a plan view of a glass melter with the electrodes arranged at equally-spaced distances at their inner ends about a regular hexagon, and illustrates another form of the invention.
Figure 4:
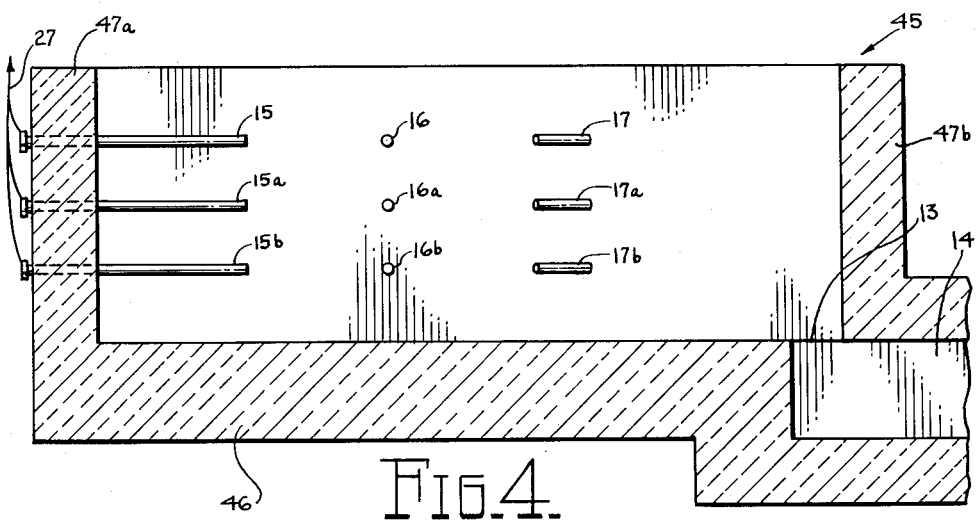
FIG. 4 is a sectional elevational view, taken along line 4—4 of FIG. 3, showing three sets of the electrodes projecting into the melting zone of the furnace through the side walls thereof and arranged in three selected parallel planes of the furnace.

Referring now to FIGS. 3 and 4, another form of electrode arrangement of the invention is illustrated, wherein is shown a melter 45 having a bottom wall 46, side walls 47, opposed end walls 47a and U-shaped end walls 47b at the outlet end of melter 45. Batch materials are added to the melter by blanket charging through the open top thereof as described for FIGS. 1 and 2, and glass is withdrawn through throat outlet 13 through a submerged passage 14 leading to a refiner (not shown). Three sets of electrodes 15–20, 15a–20a and 15b–20b are inserted through the side and end walls 47 and 47a of melter 45 and arranged so their tips are situated at the corners of a regular hexagon (outlined in dotted line in FIG. 3). Each set of electrodes 15–20, 15a–20a and 15b–20b lie in a separate horizontal plane of melter 45, said planes being spaced parallel to each other. Electrodes 15, 16, 19 and 20 are inserted perpendicularly through walls 47 and 47a. By angling the electrodes through side walls 47, as is shown for electrodes 17 and 18, the wear of the refractory blocks may be minimized. However, through angling installation, more electrode length is required. Both type of installations are therefore shown on FIG. 3. The electrodes are similarly connected to the six-phase power source, as previously described for FIG. 10, by having the corresponding electrode of each set wired in parallel to its corresponding secondary phase of the transformer, such as by lead wire 27a connecting electrodes 15, 15a and 15b in parallel to secondary winding 39, etc. (FIG. 10). The connections at the transformer may be made to convert three-phase line power to six-phase power at the secondary side of the transformer by any of the previously described transformer connections.

Figure 5:
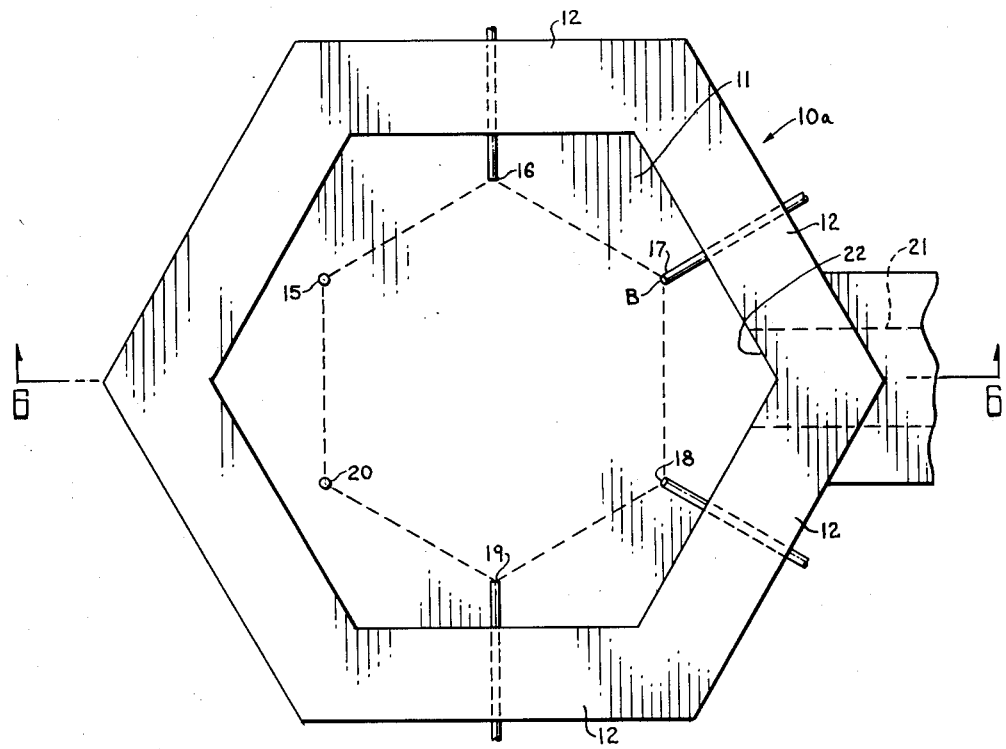
FIG. 5 is a plan view of a six-sided melter, similar to FIG. 1, showing another form of the invention.
Figure 6:
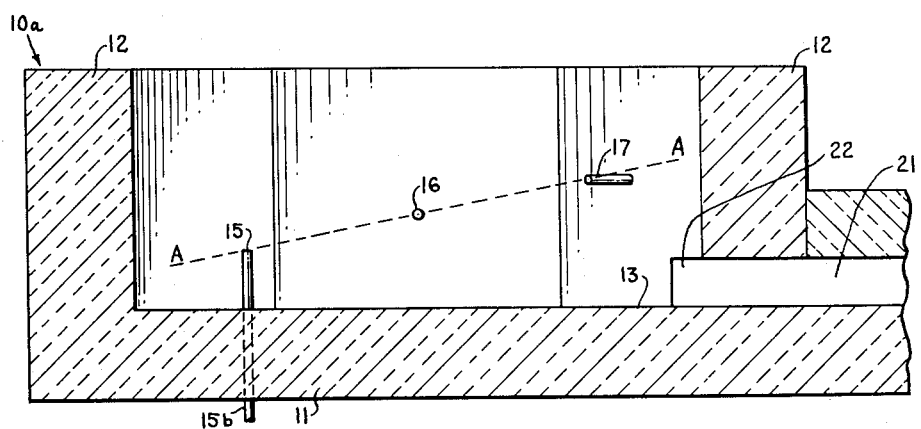
FIG. 6 is a sectional elevational view, taken along line 6—6 of FIG. 5, showing the equally-spaced electrodes of FIG. 5 inclined from the horizontal along plane A—A.

Still another form of the invention is illustrated on FIGS. 5 and 6. In FIG. 5, a melter 10a, similar to the melter shown in FIGS. 1 and 2, is connected to a refining chamber (not shown) by channel 21 adjacent the bottom wall 11. Glass is withdrawn from melter 12 at outlet 22 communicating with channel 21 (FIG. 6). Electrodes 15 and 20 are inserted through bottom wall 11 so that their inserted tips are on the same vertical elevation therein. Electrodes 16 and 19 are inserted through opposed side walls 12 of melter 10 at the same vertical elevation therein and are spaced above the elevation of electrodes 15 and 20. Electrodes 17 and 18 are inserted through side walls 12 of melter 10a above outlet 22 and their tips lie at the same vertical elevation in melter 10, above the elevation of electrodes 16 and 19. As shown in FIG. 6, the mentioned pairs of electrodes thus lie along a common plane in melter 10a, indicated by dotted line A—A so that the tips of electrodes 15 through 20 lie at the corners of a regular hexagon (FIG. 5). This regular hexagon configuration is in an inclined plane of melter 10a, which plane is inclined upwardly toward throat outlet 13 (FIG. 6). By applying heating uniformly through the thus inclined plane A—A of the melter 10a, the glass entering throat outlet 13 will be allowed to cool slightly since it is spaced a greater distance from electrodes 17 and 18 at this end of the furnace than at the opposite end of the furnace. It is deemed that this arrangement may prove beneficial in some instances for convection current control in furnace operations.

Figure 7:
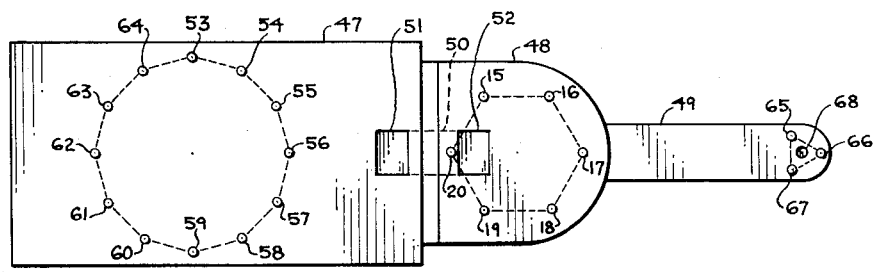
FIG. 7 is a schematic plan view of a conventional glass furnace having interconnected melting, fining and working zones illustrating three separate forms of electrode arrangements of the invention, adapted each to a different zone of the furnace.

Yet another form of the invention is illustrated in FIG. 7, wherein a conventional furnace includes a melting chamber 47, a refining chamber 48, and a working chamber or forehearth 49. The melting chamber 47 communicates with refining chamber 48 through throat passage 50, having inlet and outlet openings 51 and 52, respectively. This form of the invention illustrates three separate and operable combinations of electrode arrangements placed in the three separate zones of the furnace, namely, the melting zone 47, refining zone 48, and zone 49.

In melting zone 47, the electrodes 53 through 64 are disposed circumferentially about a circle having a diameter equal to the distance between electrodes 56 and 62 and are spaced equally one from the other as equal chordal distances on said circle in the form of a regular dodecagon (polygon having twelve equal sides). The said electrodes 53 through 64 are shown inserted through the bottom of the melting chamber 47 so that their inserted tips lie in a horizontal plane of the furnace and are submerged in the glass body contained therein. More than one set of electrodes may be used and the electrodes may be inserted horizontally through the side walls, as well as through the bottom of melting chamber 47, as mentioned, so long as each set of electrodes is arranged in the regular geometric configuration, described above, to lie in its respective selected plane of the melting chamber 47.

Figure 14:
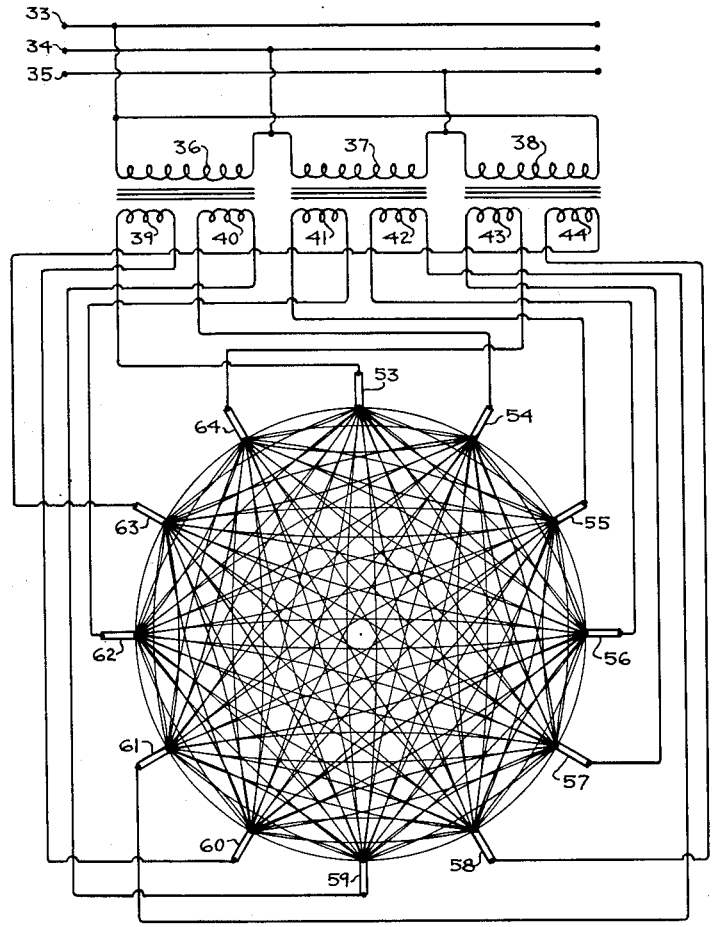
FIG. 14 is a schematic wiring diagram for the double chord connection of 12-phase power to the regular dodecagonal arrangement of electrodes shown in the melting zone on FIG. 7.

Referring to FIG. 14, in conjunction with FIG. 7, electrodes 53 through 64 are connected in a double-chord connection to a twelve-phase transformer, each electrode being connected to a different power phase of the secondary windings of the transformer. Primary windings 36, 37 and 38 are connected in delta across lines 33, 34 and 35 of a standard three-phase main line power source. In making the double-chord connection, the secondary winding 39 of the transformer is connected across opposed electrodes 53 and 60, and the phase rotation of winding 39 causes current to flow in the direction from electrode 60 to electrode 53; likewise, secondary winding 40 is connected for current to flow between electrodes 59 to 54; secondary winding 41 is connected for current to flow from electrode 55 to electrode 62; winding 42 is connected for current to flow from electrode 56 to electrode 61; and, lastly, secondary windings 43 and 44 are connected to electrodes 64 to 57 and 63 to 58 so that their phase relation is parallel. Current flow occurs, however, between all electrodes (53–64) since currents in the glass have no way of determining to which transformer winding they may belong. This is characteristic of all transformer circuits applied to a common resistance made up of the glass mass between the electrodes. This current interchange is represented in FIG. 14 by looped lines between the electrodes. The described arrangement of 12 electrode positions to a set connected to a twelve-phase power has the following advantages: (1) smaller electrodes may be used for comparable heating effect, resulting in lower cost electrodes, lower heat loss, less hazard by way of glass leaks into the electrode holders, and easier handling due to less weight per electrode; (2) lower current per electrode position is required, resulting in less complicated and less expensive electrode connectors; and (3) more effective use of furnace area.

Referring again to FIG. 7, electrodes numbered 15 through 20 are inserted through the bottom wall of refining chamber 48 so that their inner ends lie in a common plane of the refining chamber 48, and are arranged to define a regularly hexagon in said plane. Electrodes 15 through 20 may be connected in double delta, as previously described for the hexagonal electrode arrangement in FIG. 10, or in any of the other six-phase circuit connections mentioned previously herein. Obviously, the electrodes 15 through 20 may be inserted through the sides of refining chamber 48, as well as though the bottom thereof, and a plurality of sets of six electrodes may be utilized, each set lying in a different horizontal plane of the furnace, similar to the multiple set arrangements described under FIGS. 3 and 4.

Also in FIG. 7, is illustrated a still further form of the invention, wherein three electrodes 65, 66 and 67 are arranged in a selected plane of working zone 49 of the furnace and spaced equal lateral distances about orifice 68. The electrodes 65, 66 and 67 are at the corners of an equilateral triangle traversing a selected area of working zone 49, such as a triangularly shaped area in the glass located vertically over delivery orifice 68. Orifice 68 delivers molten glass past a conventional shears to form charges of the glass for the forming machinery (not shown) by conventional gob feeding.

Figure 11:
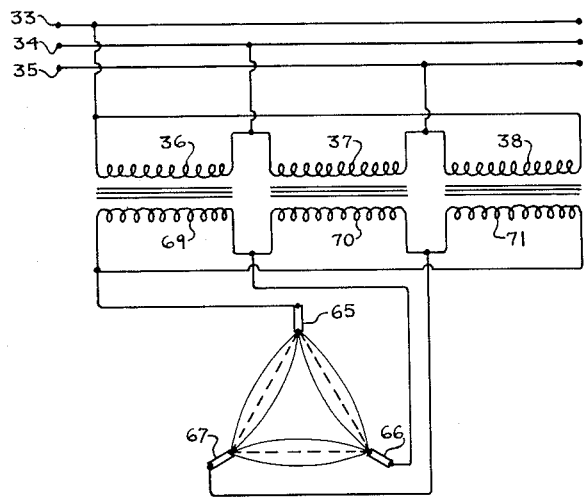
FIG. 11 is a schematic wiring diagram for the equilateral triangularly spaced electrodes shown in the working zone of the furnace on FIG. 7.

The electrode arrangement for this form of the invention is connected to the secondary side of a three-phase power circuit, as shown in FIG. 11. In FIG. 11, the primary windings 36, 37 and 38 of a three-phase transformer are connected in delta across lines 33, 34 and 35 of a standard three-phase main line power source. The three-phase secondary windings 69, 70 and 71 of the transformer are delta connected across electrodes 65, 66 and 67, respectively, so that each of the three-power phases are connected for current to flow across separate adjacent legs of the equilateral triangle defined by electrodes 65, 66 and 67. This current flow is illustrated by looped lines between the electrodes on FIG. 11. As an alternative, the three-phase secondary windings may be connected in star, as diagrammatically illustrated and explained in "Kent's Mechanical Engineering Handbook" (power) 11th Edition, by R. T. Kent, section 15–17.

Figure 8:
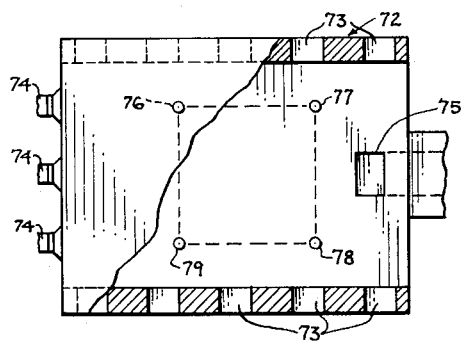
FIG. 8 is a plan view, partly in section, illustrating a conventional furnace primarily fired by combustion of consumable fuel, and provided specifically with another form of electrode arrangement of this invention for booster heating by electrical current.

Referring now to FIG. 8, still another form of the invention will be described. A conventional furnace 72, which is combustion-fired through side ports 73, has batch supplied through batch feeders 74 located at one end wall of furnace 72, and glass is withdrawn therefrom through throat outlet 75 near the other end of said furnace. Four electrodes, numbered respectively, 76, 77, 78 and 79, are inserted through the bottom of furnace 72 to lie in a common plane of the furnace at the corners of an equal sided geometric configuration defining a square (dotted outline in FIG. 8).

Figure 13:
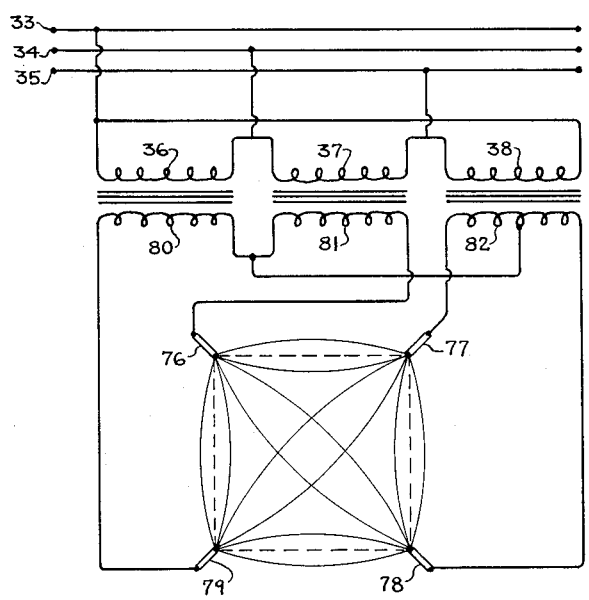
FIG. 13 is a schematic wiring diagram for the arrangement of electrodes shown on FIG. 8.

The electrodes 76 through 79, thus arranged, are connected to the power circuit shown on FIG. 13. The primary windings 36, 37, and 38 of the transformer are connected in delta across lines 33, 34 and 35 of a standard three-phase main power source. The secondary windings 80, 81 and 82 are connected to transform the three-phase power of the primary source to four-phase power at the secondary side of the transformer, and the thus transformed four-phases are connected each across respective adjacent sides of the square figure defined by electrodes 76 through 79. The current flow occurring between the electrodes is shown by looped lines on FIG. 13.

Figure 9:
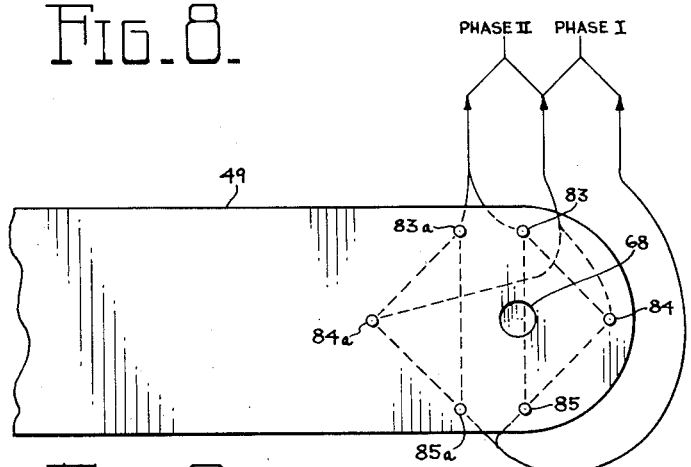
FIG. 9 is a schematic plan view of the working zone of the furnace schematically illustrating the circuit connections of the electrodes arranged in oppositely facing pair of right triangles, the power phases of a 2-phase power source being connected across the two complementary equal legs of said triangles, and presents still another form of the invention.

Referring to FIG. 9, still another form of the invention is illustrated, in which two sets of electrodes, 83, 84 and 85, and 83a, 84a and 85a, project through the bottom of forehearth 49, which represents a working zone of a furnace. Glass is withdrawn and fed from forehearth 49 at orifice 68, as previously described under FIG. 7. The two sets of electrodes, numbered 83 through 85 and 83a through 85a, each lie in a horizontal plane of forehearth 49 and are arranged to define the corners of a right triangle. The right triangles represented by the respective sets of electrodes, are disposed to have their hypotenuses parallel and adjacent in forehearth 49. Comparable electrodes of each set at each corner of each right triangle are connected as pairs in parallel, viz. 83 and 83a, 84 and 84a, and 85 and 85a. A transformed two-phase power source is applied across the corresponding equal legs of each of the triangles, as schematically illustrated on FIG. 8, as will presently be particularly described under FIG. 12.

Figure 12:
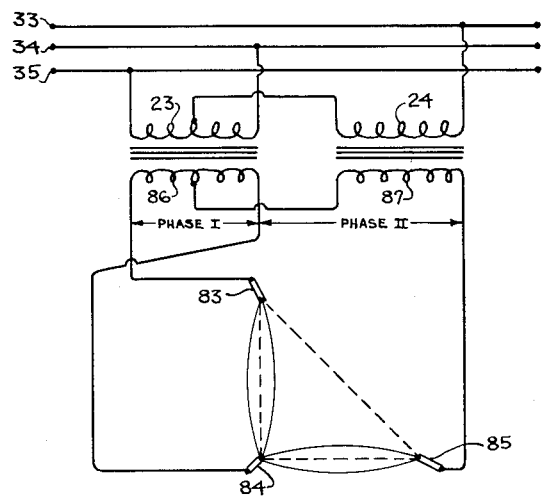
FIG. 12 is a schematic wiring diagram for the arrangement of electrodes shown on FIG. 9.

In FIG. 12, a conventional three-phase main line power source carried in lines 33, 34 and 35 is impressed across T-connected primary windings 23 and 24 of the transformer. The secondary windings 86 and 87 are likewise T-connected to transform the three-phase main line power to a secondary source of two-phase power, indicated respectively as phases I and II on FIG. 12. Phase I is connected across electrodes 83—83a and 84—84a, and phase II is connected across electrodes 84—84a and 85—85a, so that current in the respective phases I and II is directed to flow across the equal legs of each of the defined right triangles.

Having presented and described and illustrated several forms of the invention, it should be understood that the electrodes may be arranged in one or more sets in any zone of the furnace, each set having the electrode inner tips projecting into that zone to lie in a selected plane to define a geometric figure having two or more equal sides. By applying a polyphase electrical power source to like sets of the arrangement of electrodes, the polyphase source having power phases equal to the number of equal sides of the defined geometric figure, the power thus applied to any set of electrodes produces the same ratio of the voltage to the electrode separation between any selected pair of electrodes in a set as the ratio of voltage to electrode separation between any other pair of electrodes in that set. Uniform heating will thereby result in that plane of the furnace.

The particular plane of the furnace to which heat should be supplied may be readily selected at the time of installation of the electrode arrangements. Although it is generally desirable to apply the heat throughout a horizontal plane or throughout parallel horizontal planes of the furnace, it is within the scope of this invention to incline the plane to which heat will be applied, as illustrated by one form of the invention disclosed herein.

As used herein, the term "geometric configuration" is intended to encompass geometric figures generated by connecting the tips of the electrodes one to the other to trace a two-dimensional outline of a regular geometric figure, which figures include, for example, a regular hexagon, an equilateral triangle, a square, a dodecagon, and a right triangle.

Various other modifications may be resorted to within the spirit and scope of this invention as described in the appended claims.

I claim:

1. In combination with a continuous flow glass furnace having a glass melting chamber defined in part by a substantially horizontal bottom surface, an electric heating apparatus for uniformly heating glass in said chamber, said apparatus comprising a plurality of electrodes projecting into said chamber, the total number of said electrodes being a multiple of three and there being at least six electrodes, and the free inner ends of said electrodes lying in a common plane spaced above said chamber bottom surface with each free inner end being located at a corner of a regular geometric polygon so that the distance between any two adjacent inner ends is equal to the distance between any other two adjacent inner ends, and polyphase electric power supply means electrically connected to said electrodes, the number of phases in said power supply means corresponding to the number of said electrodes, and the electric power output per phase and the electrical connections between said phases and said electrodes being predetermined so that, when said power supply means is operative to supply electric power to said electrodes, the ratio of voltage to distance existing between any pair of electrodes is substantially the same whereby electric power is applied in the common plane in which the free inner ends of said electrodes are located at a uniform voltage per unit length of path through glass contained in said furnace chamber to heat the glass uniformly and thus minimize convection currents in the glass body.

2. In combination with a continuous flow glass furnace having a glass melting chamber defined in part by a substantially horizontal bottom surface, an electric heating apparatus for uniformly heating glass in said chamber, said apparatus comprising six electrodes projecting into said chamber, the free inner ends of said electrodes defining a regular hexagon having its sides lying in a common plane spaced above said chamber bottom surface, and a six-phase electric power supply means electrically connected to said electrodes, the power output per phase and the electrical connections between said phases and said electrodes being predetermined so that, when said power supply means is operative to supply electric power to said electrodes, the ratio of voltage to distance existing between any pair of electrodes is substantially the same, whereby electric power is applied in the plane in which the free inner ends of said electrodes lie at a uniform voltage per unit length of path through glass contained in said furnace chamber to heat the glass uniformly and thus minimize convection currents in the glass.

3. In combination with a continuous flow glass furnace including a glass melting chamber having a substantially horizontal bottom surface, an electric heating apparatus according to claim 2, wherein said six-phase electric power supply means comprises six transformer secondary windings connected in double delta relation with reversed phase rotation between each of the two deltas, three alternate electrodes being connected to one of said deltas, and the other three alternate electrodes being connected to the other of said deltas.

4. In combination with a continuous flow glass furnace having a glass melting chamber defined by a bottom wall and walls extending upwardly from said bottom wall, an electric heating apparatus for uniformly heating glass in said chamber, said apparatus comprising six electrodes projecting substantially horizontally from said upwardly extending walls into said chamber, the free inner ends of said electrodes defining a regular hexagon having its sides lying in a common substantially horizontal plane spaced above said chamber bottom wall, and a six-phase electric power supply means electrically connected to said electrodes, the power output per phase and the electrical connections between said phases and said electrodes being predetermined so that, when said power supply means is operative to supply electric power to said electrodes, the ratio of voltage to distance existing between any pair of electrodes is substantially the same, whereby electric power is applied in the plane in which the free inner ends of said electrodes lie at a uniform voltage per unit length of path through glass contained in said furnace chamber to heat the glass uniformly and thus minimize convection currents in the glass.

5. In combination with a continuous flow glass furnace having a glass melting chamber defined by a bottom wall and walls extending upwardly from said bottom wall, an electric heating apparatus for uniformly heating glass in said chamber, said apparatus comprising plural sets of electrodes projecting from said upwardly extending walls into said chamber, each set of electrodes consisting of six electrodes having their free inner ends positioned to define a regular hexagon having its sides lying in a common horizontal plane spaced above said chamber bottom wall, the respective horizontal planes in which the inner electrode ends of each set of electrodes lie being spaced apart vertically with respect to said chamber bottom, and a six-phase electric power supply means electrically connected to each set of electrodes, the power output per phase and the electrical connections between said phases and said electrodes being predetermined so that, when said power supply means is operative to supply electric power to said electrodes, the ratio of voltage to distance existing between any pair of electrodes in a set of electrodes is substantially the same, whereby electric power is applied in the plane in which the free inner ends of said electrodes lie at a uniform voltage per unit length of path through glass contained in said furnace chamber to heat the glass uniformly and thus minimize convection currents in the glass.

6. In combination with a continuous flow glass furnace having a glass melting chamber defined by a bottom wall and walls extending upwardly from said bottom wall, an electric heating apparatus for uniformly heating glass in said chamber according to claim 5, wherein there are at least three sets of electrodes, the respective sets of electrodes being located in vertically superposed spaced relation with respect to each other with the vertical spacing between adjacent sets of electrodes being substantially equal.

References Cited in the file of this patent

UNITED STATES PATENTS

| | | |
|---|---|---|
| 1,999,744 | Wadman | Apr. 30, 1935 |
| 2,018,885 | Ferguson | Oct. 29, 1935 |
| 2,413,037 | De Voe | Dec. 24, 1946 |
| 2,594,972 | Muehlenkamp | Apr. 29, 1952 |
| 2,749,378 | Penberthy | June 5, 1956 |
| 2,767,735 | Herrold et al. | Oct. 16, 1956 |
| 2,773,111 | Arbeit et al. | Dec. 4, 1956 |